US 6,467,829 B2

(12) United States Patent
Kaluszka et al.

(10) Patent No.: US 6,467,829 B2
(45) Date of Patent: *Oct. 22, 2002

(54) TOOL RETAINING VEHICLE SPARE TIRE STORAGE SYSTEM

(75) Inventors: Medard E Kaluszka, Sterling Heights, MI (US); Norman H Bennett, Clinton Township, MI (US); Linda A Rivera, Troy, MI (US)

(73) Assignees: DaimlerChrysler Corporation, Auburn Hills, MI (US); Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/522,351

(22) Filed: Mar. 9, 2000

(65) Prior Publication Data

US 2002/0053810 A1 May 9, 2002

(51) Int. Cl.[7] .............................. B60N 3/12; B62D 43/00
(52) U.S. Cl. ................... 296/37.3; 296/37.1; 296/37.14
(58) Field of Search ............................. 296/24.1, 37.1, 296/37.2, 37.3, 37.14

(56) References Cited

U.S. PATENT DOCUMENTS

| 1,434,350 A | 10/1922 | Collins | |
| 1,927,922 A | 9/1933 | Crum | 296/37 |
| 2,005,604 A | 6/1935 | Thrine | 296/37 |
| 2,649,191 A | 8/1953 | McLAughlin | 206/16 |
| 2,699,865 A | 1/1955 | Bowen | 206/16 |
| 2,831,622 A | 4/1958 | Bacca | 224/42.24 |
| 3,513,969 A | 5/1970 | Roff | 206/16 |
| 3,918,683 A | 11/1975 | Millar | 254/93 R |
| 4,416,483 A | 11/1983 | Koch | 296/37.1 |
| 4,917,279 A | 4/1990 | Brow et al. | 224/42.14 |
| 5,328,029 A | * 7/1994 | Chow | |
| 5,518,158 A | 5/1996 | Matlack | 224/402 |
| 5,520,400 A | 5/1996 | Hung | 280/47.26 |
| 5,586,698 A | 12/1996 | Satoh | 224/42.24 |
| 5,626,380 A | 5/1997 | Elson et al. | 296/39.1 |
| 5,799,845 A | * 8/1998 | Matsushita | 296/42.14 |
| 5,860,687 A | 1/1999 | Corporan et al. | 296/37.2 |
| 6,033,003 A | * 3/2000 | Bell et al. | |

FOREIGN PATENT DOCUMENTS

JP          6-247211 A   *   9/1994   ............... 296/37.3

* cited by examiner

Primary Examiner—D. Glenn Dayoan
Assistant Examiner—Scott Carpenter
(74) Attorney, Agent, or Firm—Ralph E. Smith

(57) ABSTRACT

A storage system for a vehicle spare tire having a tool retaining cover. The cover includes a main body defining tool retaining portions. The tool retaining portions frictionally retain tools placed in them.

17 Claims, 3 Drawing Sheets

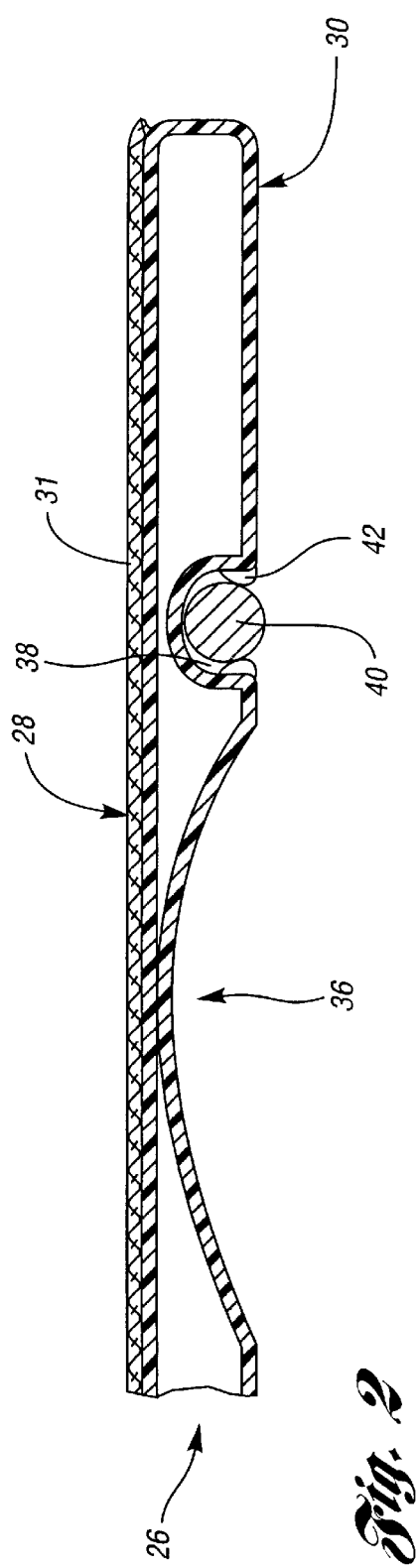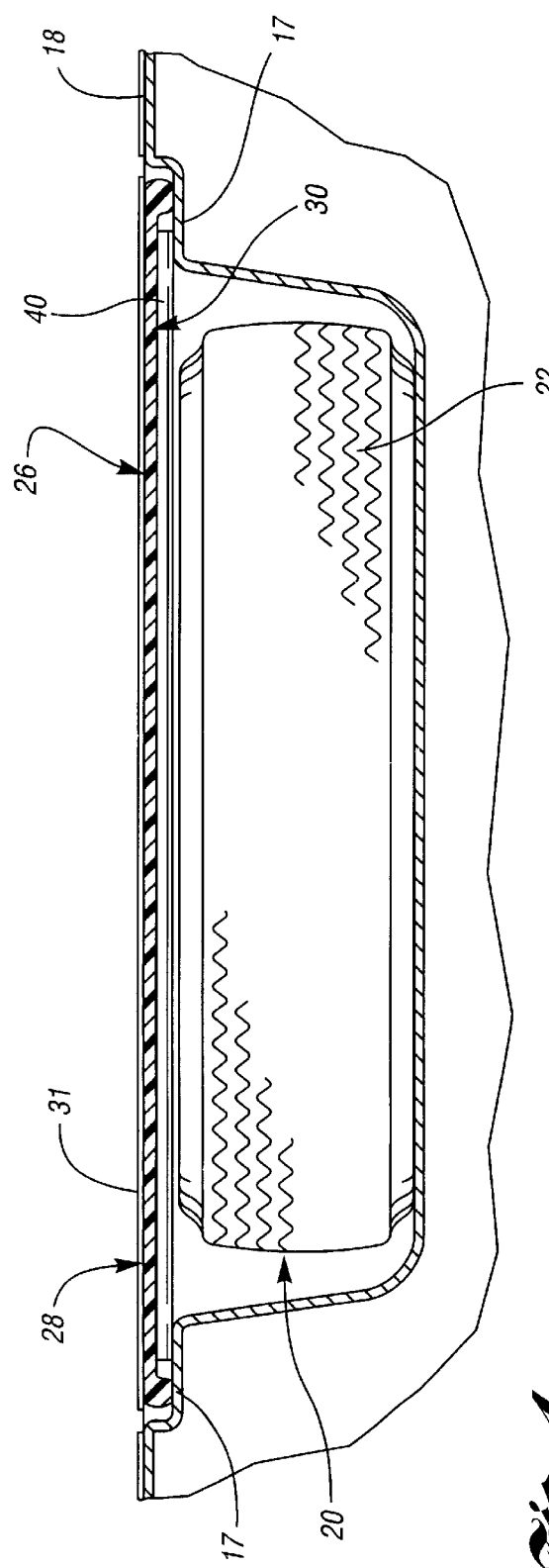

TOOL RETAINING VEHICLE SPARE TIRE STORAGE SYSTEM

BACKGROUND OF THE INVENTION

1. Technical Field

The present invention generally relates to a storage system for a vehicle spare tire. More particularly, the present invention relates to a storage system for a spare tire of a vehicle having a rearwardly located storage area, the storage system including a storage tub located below the floor of the vehicle and a tool retaining cover therefore.

2. Discussion

Automotive vehicles, such as minivans, vans, station wagons, sport utilities and the like are often purchased for their carrying capacity. These types of vehicles typically include a rear storage area accessible from a lift gate or tail gate. Because such vehicles are not provided with a trunk, packaging issues frequently arise concerning storage of the spare tire. Frequently, the spare tire is mounted in an upright position within the rearward storage area and adjacent to one of the vehicle side walls. However, this type of storage significantly impacts the carrying capacity of the vehicle.

It is also known to store the spare tire within a storage compartment or tub provided below the vehicle's floor. A cover is typically provided for concealing the tub. While such arrangements do not limit the carrying capacity of the rearward storage area, a need remains for suitably securing associated tools in such an arrangement. In this regard, a crowbar and other tools which are needed for tire changing are often difficult to access.

It is also known to store the spare tire within a storage compartment or tub provided below the vehicle's floor. A cover is typically provided for concealing the tub. One known arrangement is described in a commonly assigned U.S. patent application filed Sept. 15, 1998 and assigned U.S. Ser. No. 09/153,708 which is hereby incorporated by reference as fully set forth herein. While arrangements of the type shown in U.S. Ser. No. 09/153,708 do not limit the carrying capacity of the rearward storage area, a need remains for suitably securing associated tools in such an arrangement. In this regard, a crowbar and other tools which are needed for tire changing are often difficult to access.

SUMMARY OF THE INVENTION

It is a general object of the present invention to provide a storage system for a vehicle spare tire having a tool retaining cover.

In one form, the present invention provides a cover for a spare tire storage system including a tub located beneath a floor of a vehicle. The cover includes a main body defining at least one tool retaining portion.

In an extension of the above form, the tools received within the tool retaining portions provide support for the cover over the tub.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 2 is a cross-sectional view taken along the line 2—2 of FIG. 1.

FIG. 4 is a cross-sectional view taken along the line 4—4 of FIG. 1.

DETAILED DESCRIPTION OF THE PREFERRED EMBODIMENT

Figure 1:
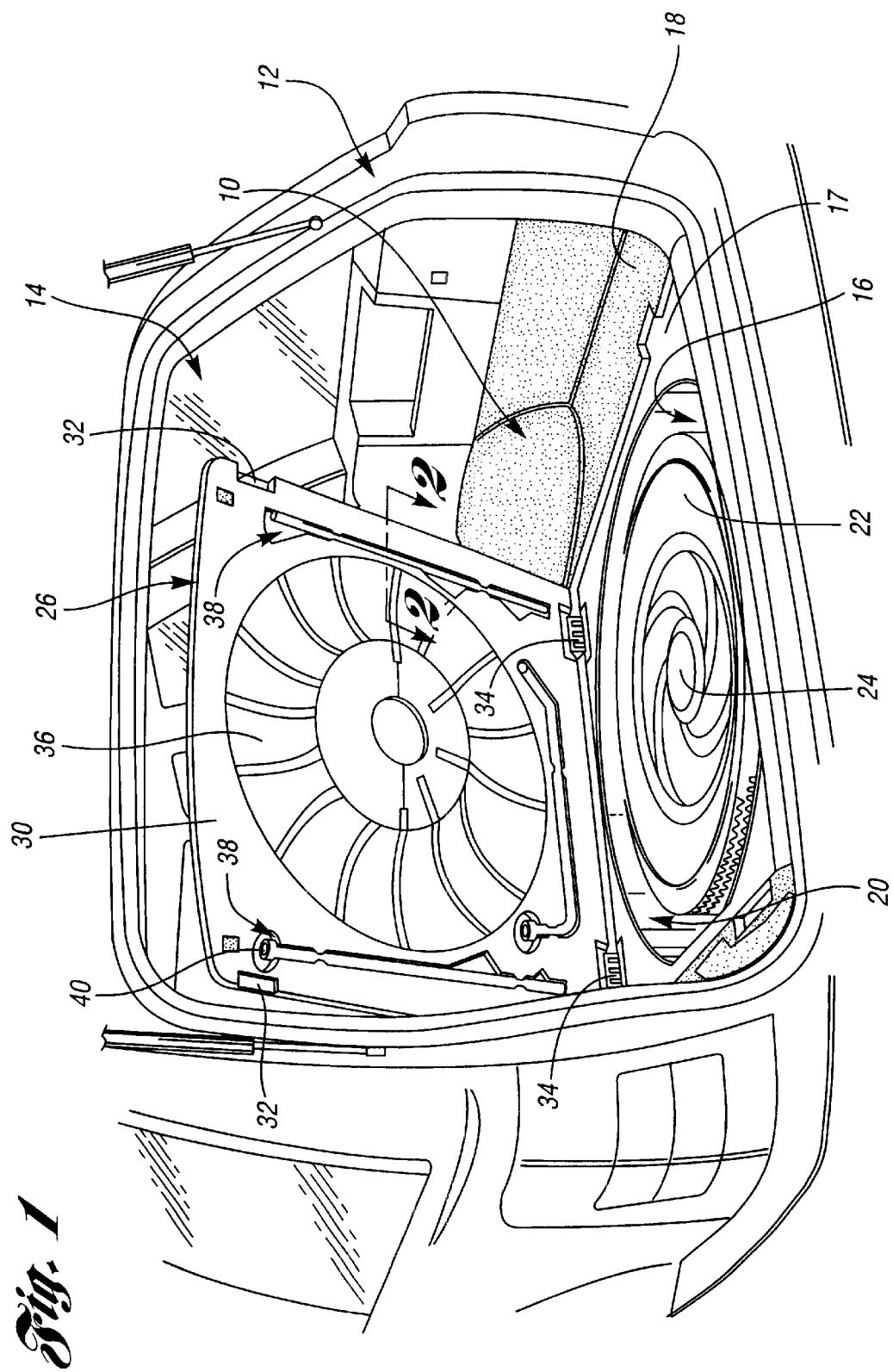
FIG. 1 is an environmental view of storage system for a spare tire constructed in accordance with the teachings of a preferred embodiment of the present invention, the storage system shown operatively incorporated into an exemplary motor vehicle with a cover of the storage system articulated to an open position.

Turning first to the environmental view of FIG. 1, a spare tire storage system constructed in accordance with the teachings of the preferred embodiment of the present invention is shown and generally identified at reference number 10. The spare tire storage system 10 is illustrated incorporated into a motor vehicle 12. In the embodiment illustrated, the spare tire storage system 10 is shown operatively installed within a rear storage area 14 of the vehicle 12. The particular vehicle partially shown in FIG. 1 is a minivan, sport utility vehicle, or the like. However, it will be understood that the teachings of the present invention are widely applicable to various other vehicles.

The spare tire storage system 10 of the present invention is shown to include a tub 16 located below the floor 18 of the vehicle 12. The tub 16 defines a storage recess or area 20 for storing a spare tire 22. Extending out from the tub 16 is a peripheral flange 17 which is located below the floor 18 of the vehicle 12, but not to as great a depth as the tub 16. The spare tire 22 illustrated is a full-size spare, but alternatively a reduced-size spare may be stored. The spare tire 22 is secured within the storage area 20 by a conventional clamping mechanism 24. The spare tire storage system 10 is further shown to include a cover 26 for selectively providing access to the storage area 20.

Figure 3:
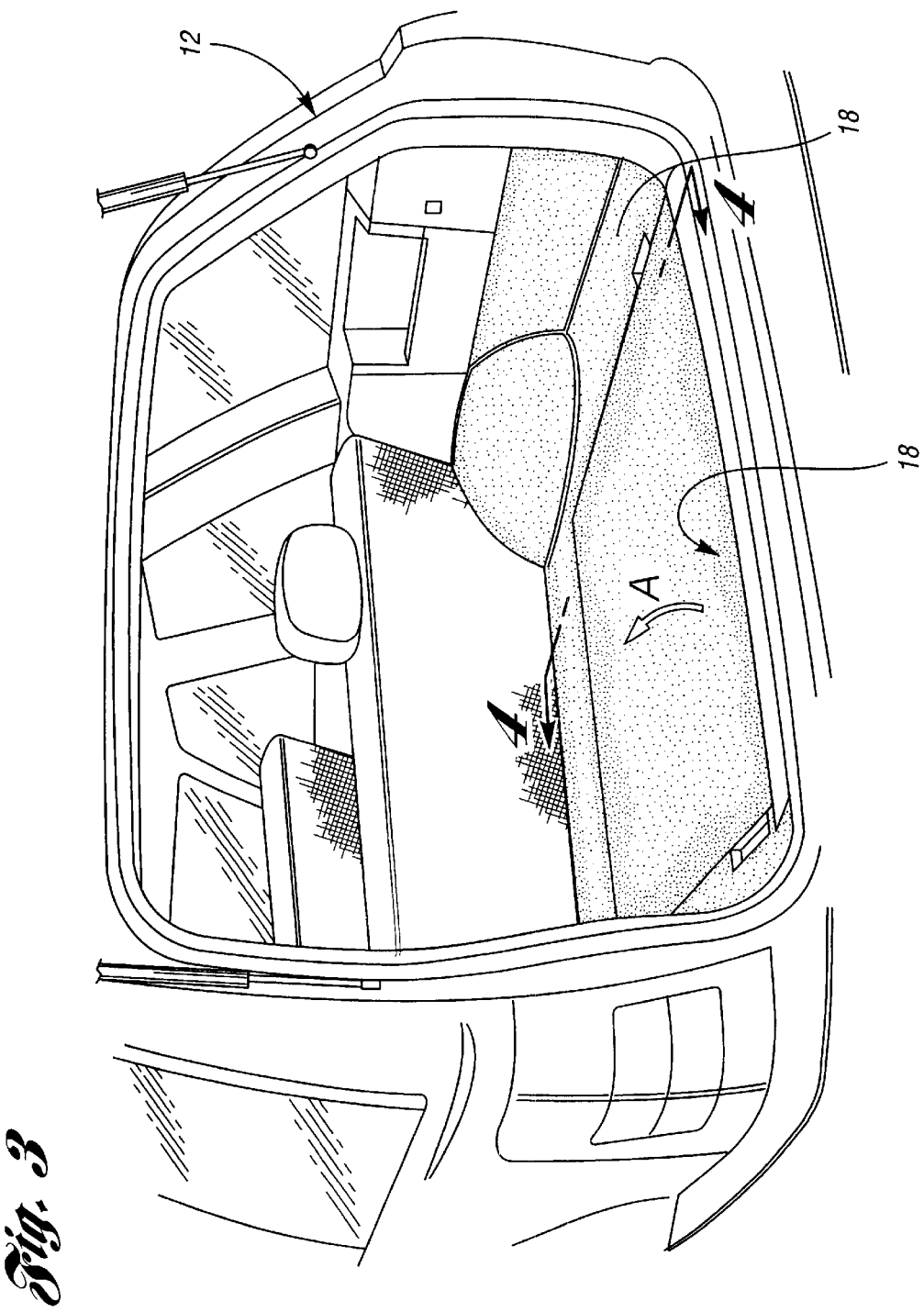
FIG. 3 is a perspective view similar to FIG. 1, illustrating the cover articulated to a closed position.

With continued reference to FIG. 1 and additional reference to FIGS. 2 through 4, the cover 26 will now be further described. In general, the cover 26 has a main body including an upper side 28 and a lower or underside 30. As partially shown in the cross-sectional view of FIG. 2, a carpet 31 is attached to the upper side 28. The cover 26 is also shown to generally include a pair of handle areas 32 (shown in FIG. 1) and a pair of conventional hinges or pivot tabs 34 (again, shown in FIG. 1). The pivot tabs 34 are adapted to engage recesses (not specifically shown) carried by the vehicle 12 to facilitate pivotal movement of the cover 26 from a closed position (as shown in FIG. 3) and open position (partially shown in FIG. 1). The direction of movement is indicated in FIG. 3 by arrow A. The pivot tabs 34 also permit quick and easy withdrawal of the cover 26 from the vehicle 12.

Referring further to FIGS. 1–2 and 4, the underside 30 of the lid 26 will be detailed. The underside 30 includes a generally toroidal-shaped recess 36 adapted to receive a side of the spare tire 22 when located in the tub 16. This recess 36 will allow the spare tire 22 to support the cover 26 thus allowing a greater load carrying capacity. Additionally, the underside 30 will contain at least one integrally formed tool-retaining recess indentation 38 to retain one or more tools 40. FIG. 1 shows the underside 30 formed to include three such recesses 38 having generally C-shaped cross sections with downwardly extending sides and individually retaining three tools 40 in a snap-fit relationship. In the preferred embodiment, the recesses 38 are blow molded with the cover 26. FIG. 4 shows the recesses 38 in underside 30 to extend substantially across the cover 26, either longitudinally or laterally with a first end and a second end extending beyond the storage recess 20 when the cover 26 is closed. As a result, one or more of the tools 40 extend onto and are directly supported by the flange 17. Thus, one or more of the tools 40 provide further support for the cover 26.

The tools 40 are frictionally retained within their respective recesses 38 by retaining members 42. The retaining members 42 are integrally formed with the cover 26 and extend into the associated recesses 38. The retaining members 42 are preferably arranged in opposing pairs. Each of the retaining members 42 terminates in a convexly shaped lobe. The convex shape of the lobes on the retaining members 42 allow for frictional retention of the tools 40, but also allow for ease of removal when needed.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A cover for a spare tire storage tub located within an interior space of a vehicle, the cover comprising:
   a main body portion including at least one tool retaining portion integrally formed in an underside thereof; and
   a pivot tab located at an edge of the main body portion, the pivot tab arranged to pivotally engage the vehicle to allow positioning of the main body portion over the spare wheel tub, as well as support the main body portion for movement between an open position allowing access to the spare wheel tub, and a closed position covering the spare wheel tub, wherein the at least one tool retaining portion is arranged to frictionally retain at least one tool therein, and is located on the underside of the main body portion so as to position a retained tool into contact with the vehicle to provide support for the main body portion when in the closed position.

2. The cover of claim 1, wherein the main body portion is injected molded to integrally include the at least one tool retaining portion.

3. The cover of claim 1, wherein the at least one tool retaining portion includes a recess formed in the underside of the main body portion to extend substantially parallel to a longitudinal axis of the vehicle.

4. The cover of claim 1, wherein the underside is formed to include a recess adapted to receive a side of a spare tire located in the tub.

5. The cover of claim 4, wherein the recess is concavely curved inside of the recess.

6. The cover of claim 1, wherein the at least one tool retaining portion includes a recess having a generally C-shaped cross section with first and second downwardly extending sides.

7. The cover of claim 6, wherein each of the first and second downwardly extending sides includes a convexly curved lobe extending into the recess.

8. A spare tire storage system for a motor vehicle comprising:
   a storage tub defining a recess for receiving a spare tire, wherein the storage tub includes a flange surrounding at least a portion of the periphery of the recess; and
   a storage cover comprising a main body portion connected to the vehicle for selectively providing access to the storage tub, the main body portion including at least one tool retaining portion integrally formed in an underside thereof; wherein the at least one tool retaining portion is arranged to frictionally retain at least one tool therein, and is located so as to position a retained tool into contact with the support flange to provide support for the main body portion when in a closed position.

9. The spare tire storage system of claim 8, wherein the main body portion is blow molded to integrally include the at least one tool retaining portion.

10. The spare tire storage system of claim 8, wherein the underside of the storage cover is formed to include a recess adapted to receive a side of a spare tire located in the tub.

11. The spare tire storage system of claim 10, wherein the recess is concavely curved in a radial direction.

12. The spare tire storage system of claim 8, wherein the at least one tool retaining portion includes a recess having a generally C-shaped cross section with first and second downwardly extending sides.

13. The spare tire storage system of claim 12, wherein each of the first and second downwardly extending sides includes a convexly curved lobe extending into the recess for frictionally retaining the tool.

14. A motor vehicle comprising:
   a body defining a rear storage area including a floor;
   a storage tub disposed below the floor and accessible through an opening in the floor, the storage tub defining a recess for retaining a spare tire therein;
   a storage cover for selectively providing access to the storage tub, the storage cover including a main body portion having at least one tool retaining portion integrally formed in an underside thereof, the at least one retaining portion formed so as to frictionally retain a tool to the main body portion; and
   a flange provided in the body surrounding at least a portion of the periphery of the storage tub recess, wherein the at least one tool retaining portion is located so as to position a retained tool into contact with the flange so as to reinforce the storage cover when in a closed position.

15. The motor vehicle of claim 14, wherein the main body portion includes a recess formed in the undersigned thereof for receiving a side of the spare tire.

16. The motor vehicle of claim 15, wherein the generally toroidal recess is concavely curved in a radial direction.

17. The motor vehicle of claim 14, wherein the at least one tool retaining portion includes a recess having a generally C-shaped cross section with first and second downwardly extending sides, each of the first and second downwardly extending sides including a convexly curved lobe extending into the recess for frictionally retaining the tool.

* * * * *